US006495792B1

(12) United States Patent
Gysi

(10) Patent No.: US 6,495,792 B1
(45) Date of Patent: Dec. 17, 2002

(54) METHOD AND DEVICE FOR POSITIONING EDGES, ESPECIALLY IN TUBE WELDING

(75) Inventor: Peter Gysi, Bellikon (CH)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 09/831,802
(22) PCT Filed: Aug. 19, 1999
(86) PCT No.: PCT/CH99/00383
§ 371 (c)(1), (2), (4) Date: May 14, 2001
(87) PCT Pub. No.: WO00/29164
PCT Pub. Date: May 25, 2000

(30) Foreign Application Priority Data

Nov. 13, 1998 (CH) ................................................ 2282/98

(51) Int. Cl.⁷ .............................................. B23K 28/02
(52) U.S. Cl. ............................... 219/121.63; 219/121.82
(58) Field of Search ....................... 219/121.63, 121.64, 219/121.82–121.31, 79, 61.13; 228/148, 17.5, 9, 44.3, 49.1

(56) References Cited

U.S. PATENT DOCUMENTS

| 2,792,799 A | 5/1957 | Dahlstrom |
| 3,234,352 A | * 2/1966 | Morris et al. ............ 219/61.13 |
| 3,300,944 A | * 1/1967 | Thesing ...................... 493/186 |
| 3,523,513 A | * 8/1970 | Maier et al. ................. 138/171 |
| 3,784,081 A | * 1/1974 | Karmann et al. .......... 219/61.3 |
| 4,341,943 A | 7/1982 | Nilsen |
| 4,774,391 A | 9/1988 | Weil |
| 5,143,274 A | 9/1992 | Laupretre et al. |

FOREIGN PATENT DOCUMENTS

FR 2 660 225 10/1991

* cited by examiner

Primary Examiner—M. Alexandra Elve
Assistant Examiner—Jonathan Johnson
(74) Attorney, Agent, or Firm—McCormick, Paulding & Huber LLP

(57) ABSTRACT

For tube welding, use is made of a locator element intruding into the tube and running with the tube, to position the edges of the tube-round ahead of the welding point with its laser beam (4). The running locator element has a plurality of stops (8, 9, 10, 11) arranged on a driven revolving chain (7). Forming elements (15, 15') act on the outside of the tube-round to position the edges. A precise edge-positioning for welding, in particular for tube welding, can thus be achieved.

25 Claims, 10 Drawing Sheets

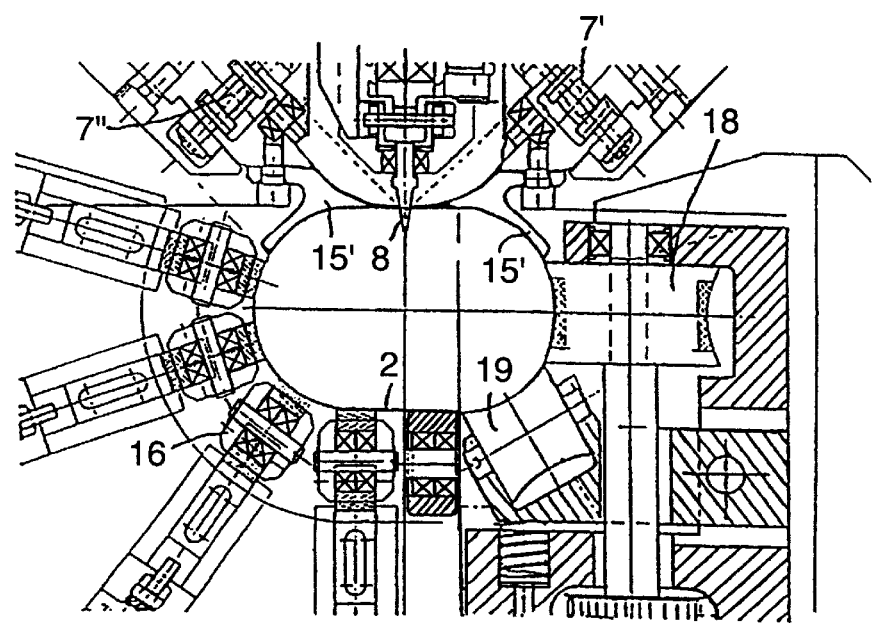
FIG. 6
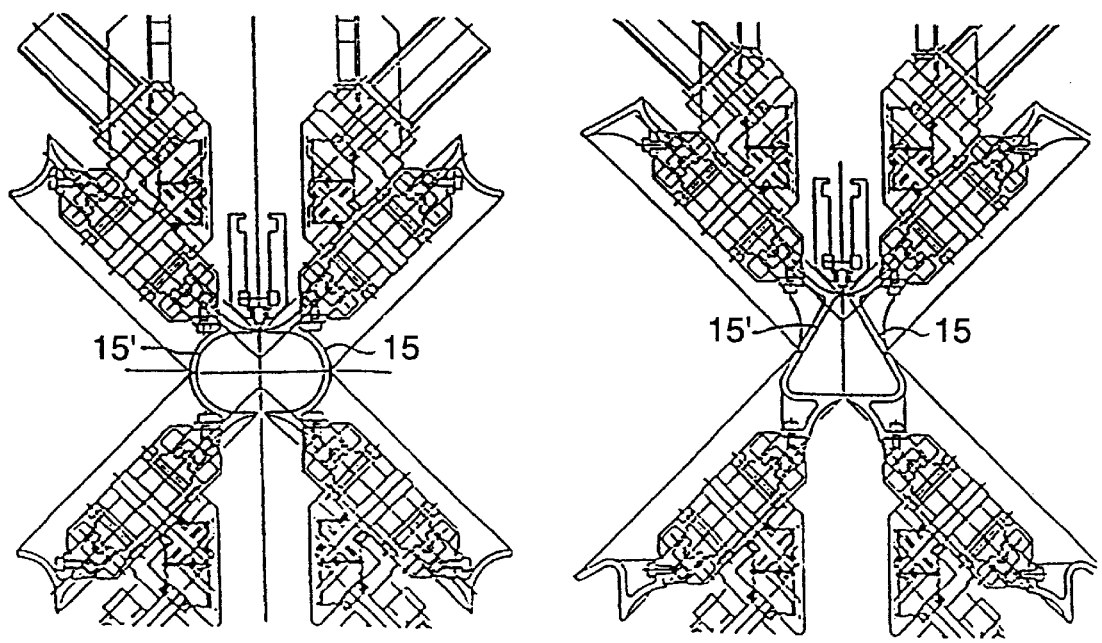
FIG. 7
FIG. 8

METHOD AND DEVICE FOR POSITIONING EDGES, ESPECIALLY IN TUBE WELDING

BACKGROUND OF THE INVENTION

The invention relates to a method and an apparatus for positioning sheet metal edges for butt welding.

When welding thin-walled tubes meaning tubes with a ratio of tube diameter to tube material thickness of, say, a 65 it is known from DE-C-4432674 to hold the tube with a clamping device involving the use of an inner support arm. Positioning the tube in this clamping device is relatively tricky and expensive. Meanwhile there is an increasing demand for welded thin-walled tubes in extremely diverse cross-sections which can subsequently be shaped into components e.g. for the motor vehicle industry e.g. by internal high pressure forming (hydroforming). The forming process depends on the presence of a weld seam of high quality, which in turn requires the abutting edges to be precisely located during welding. The same requirement also arises, of course, in the butt welding of flat sheet-metal items.

Hence one fundamental problem of the invention is to provide a method and/or an apparatus allowing the edges to be precisely positioned.

SUMMARY OF THE INVENTION

This problem is solved, in the case of a method of the kind by a method and apparatus for positioning sheet metal edges as they are moved to a welding point for welding by a laser. An endless locator projects between the edges and travels with the edges along a leg of a conveyor path leading to a welding point. The locator element is formed by a revolving chain or belt and has a plurality of stops. At least one endless forming element also travels with the edges toward the welding point for acting on the sheet margin. The forming element may be a chain or belt with a plurality of forming pieces preferably exchangeably arranged thereon.

By providing a locator element travelling with the edges to be welded, the edges can be positioned against this element with suitable force without any possibility of the positioning's being compromised by friction forces between edges and locator element.

Preferably, the locator element is adapted to assist the bringing together of the edges by provided it with wedge-shaped stops projecting between the edges to different depths. A preferred application of the method lies in the welding of preformed rounds into tubes, particularly into thin-walled tubes. The exact positioning and bringing together of the edges that can be achieved is especially advantageous in this application.

A further problem of the invention is to provide an apparatus for positioning sheet-metal edges.

This is accomplished, in the case of the apparatus stated at the outset, in which the locator elements project between the edges of the sheet metal along the leg of the conveyor path.

The endless element moving with the edges provides a stop that allows frictionless contact to be made between the sheet-metal edges being conveyed, and hence allows precise positioning.

Preferably, the apparatus has wedge-shaped stops and moreover preferably has an adjustable carrier for the endless element enabling the latter's point of insertion and depth of insertion to be adjusted.

According to the state of the art, rollers are used on the outside of the sheets: in particular, profiled rollers adapted to the outer contour of the tube are used near the welding zone to position the sheets, tube-round, or sheet edges. These rollers are positioning elements acting merely in line, and in the welding zone they have to be cooled, which is expensive.

Therefore the problem exists of providing a means of acting on the sheet to position the sheet, again with a particular view to obtaining the weld quality required for tubes, and thin-walled tubes in particular, especially when the tubes are to be subsequently subjected to internal high pressure forming. A similar problem of edge positioning can also arise in the welding of flat sheets.

The problem is solved, in the case of a method of the kind stated at the outset.

By subjecting the sheet to the action of an endless forming element which moves with the sheet along a leg of the conveyor path, regions of the sheets can be acted upon in a way that allows their edges to be very accurately positioned with respect to each other. Because the endless forming element travels past the welding point and does not remain stationary, special cooling for the said element is usually unnecessary.

The forming element is preferably provided as a cup-shaped containing element for the sheet, particularly in the upper part of a tube-round, and on either side of the weld line.

A further problem of the invention is to provide an edge-positioning apparatus which does not possess the above-mentioned disadvantages.

This is solved, in the case of an apparatus of the kind stated at the outset.

The endless forming element provides a continuous rest for the sheet margins, allowing precise positioning of the edges, even if the sheets are very thin. Furthermore, the forming element does not need cooling.

A further problem of the invention is to cater for the welding of tapered tubes, preferably by the above-mentioned methods. This is realized by arranging a conically preformed tube-round in a conical die and a weld side upper closure of the die has at least one endless forming element conveyed with the die.

A further problem of the invention is to provide an apparatus for welding tapered tubes, preferably corresponding to one of the above-mentioned apparatuses.

This problem is also solved by a conical die to contain the tube-round and at least one forming element that is conveyed with the die to a welding station.

BRIEF DESCRIPTION OF THE DRAWINGS

To elucidate the methods and apparatuses, embodiments of the same will now be described in detail by way of example and with reference to the Figures, in which

FIG. 6 shows a modified embodiment in a similar section view to FIG. 5;

FIG. 7 shows a simplified section view of a further embodiment;

FIG. 8 is a similar representation to FIG. 7, with forming pieces of a different shape;

DESCRIPTION OF THE PREFERRED EMBODIMENTS

Figure 1:
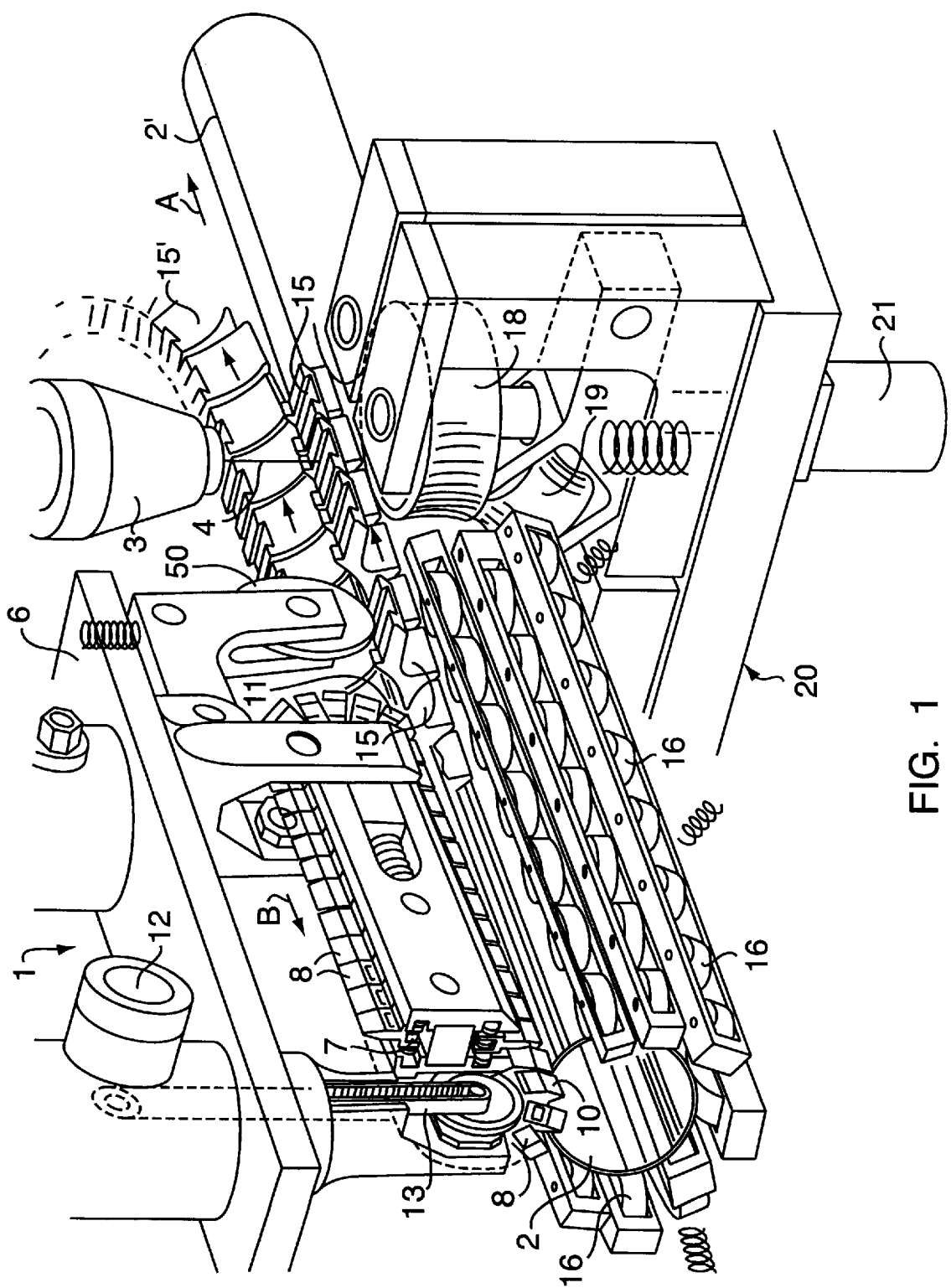
FIG. 1 is a perspective view of a first embodiment.

FIG. 1 shows, in perspective view, a positioning apparatus 1 on a welding machine (not shown in detail) which is used for welding a tube-round into a tube 2'. For this purpose, a welding head 3 is provided, which welds together the butted edges of the round by means of the welding beam 4 from a laser beam source (not shown). The tube 2', which is in particular a thin-walled tube with a diameter to material-thickness ratio of 65 or more, is subsequently shaped e.g. by internal high pressure forming into e.g. a body component for a vehicle. The present invention is concerned with the positioning of the edges of the sheet to be welded. In order to obtain a weld seam of sound quality, correct edge-to-edge positioning must be achieved. According to a first aspect of the invention, this is brought about by an endless locator element which travels with the tube-round 2 and tube 2' moving in the direction of the arrow A, and, along a common leg with the edges of the tube-round 2 and the tube 2', forms a stop for these edges. In the illustrated example, the locator element is formed by a chain 7 provided with a plurality of stops 8, 9, 10 and 11 (only some of the stops carry reference numbers). This endless chain is mounted on a schematically illustrated carrier 6, and is made to run round in the direction of the arrow B by a drive 12, e.g. by the toothed belt shown and by a sprocket driven by said belt. Along a leg of the path the stop pieces 8 dip between the edges: in FIG. 1, the stop piece which has just dipped is shown as number 10, and the stop piece which has reemerged from the tube-round at the end of the leg, as number 11. Preferably, the locator element with its stop pieces forms a stop for the edges which allows the edges to run towards each other. For this purpose, the stop pieces 8 in the illustrated example are made wedge-shaped, and the carrier determines a depth of insertion of the stop pieces which changes along their common path with the edges, thereby narrowing the stop in the conveying direction, as will be explained in more detail presently. It would of course also be possible to design the locator element with non-wedge-shaped stop pieces presenting a constant stop-width. In a basically known manner, the tube-round is acted upon and guided by a large number of rollers 16 and also by rollers 18 and 19. The rollers 16, by pressing on the tube-round 2, cause the edges of the tube-round to press against the locator element. The roller 18 in particular can be driven by a drive 21 to convey the tube-round through the apparatus 1 and 7 onwards through the welding machine. Further live rollers or conveyor means in the form of fingers may also be provided for this purpose.

According to a further aspect of the invention, the upper guide adjacent to the weld line, and to the edges, is provided not as rollers but as a forming element 15 and 15' which likewise keeps pace with the tube-round/tube. Each half of this forming element, whose presence is only indicated in FIG. 1, e.g. likewise comprises a chain which carries forming pieces adapted to the desired external form of tube-round and tube. These forming pieces make up a kind of moving shell, positioning the margins of the sheet and thus also positioning the edges. The forming elements 15 and 15' are also guided, as endless chains, so that they leave the tube after the welding point and reestablish contact with the tube-round before the welding point.

The two aspects of the invention—the dipping, travelling locator element and the travelling outer forming element—can each be used on its own for edge positioning, and can each, on its own, be combined with known elements; or they can be used in combination, as shown in FIG. 1. If only the dipping locator element is used, conventional rollers arranged on the outside of the tube-round and tube in the form of roller rings are provided instead of the forming elements 15 and 15'. If only the travelling forming element 15 and 15' is used, a conventional fixed rail, known in itself, with grooves for the sheet ends with the edges, can be used as locator element. Preferably, however, the two aspects of the invention are combined in order to position the edges.

Figure 2:
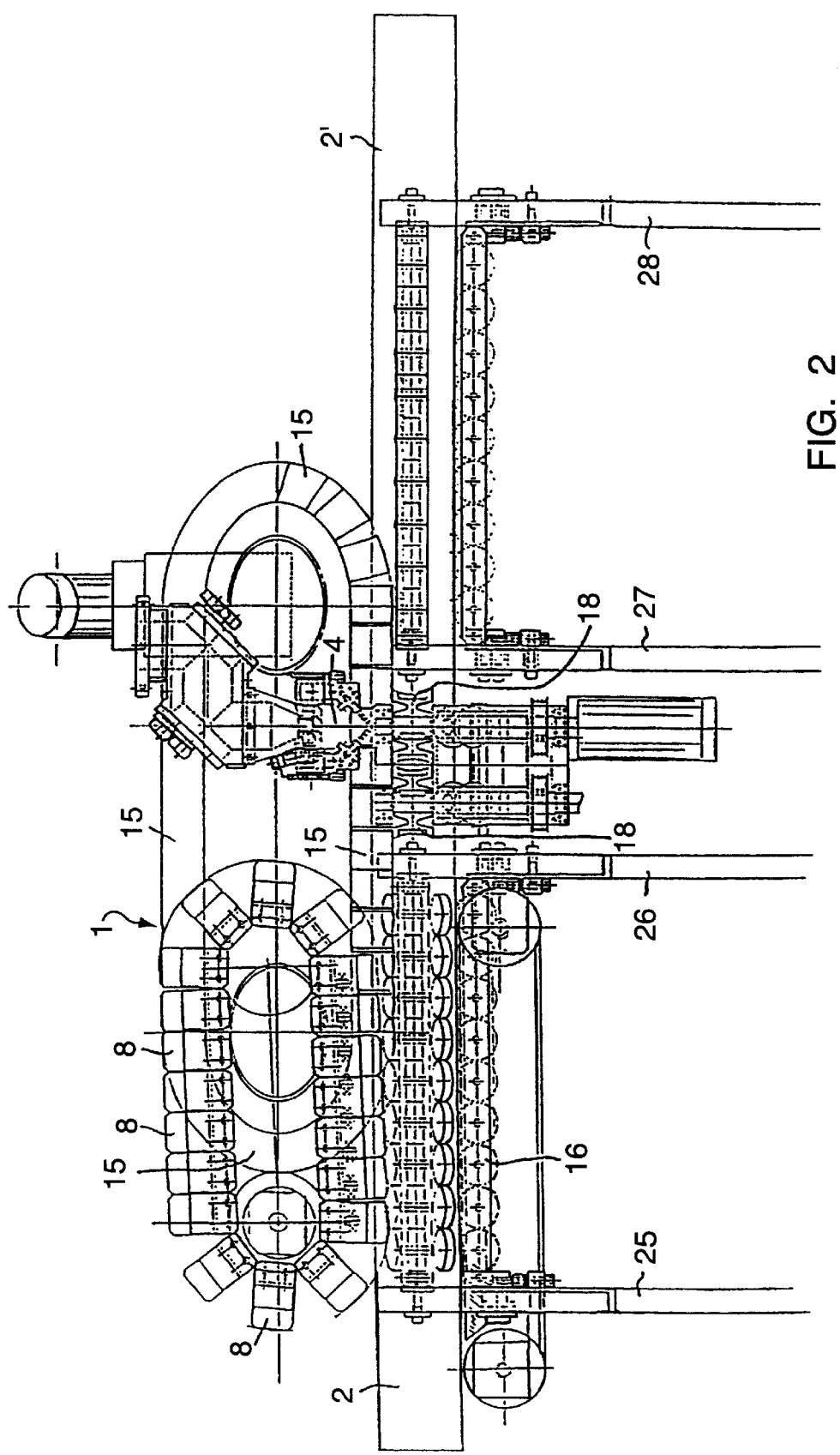
FIG. 2 is a side view of an apparatus according to FIG. 1.

FIG. 2 shows a side view of a welding arrangement with the positioning apparatuses according to the invention. Here again the round 2 which becomes the welded tube 2' can be seen, and the rollers 16 and 18, known in themselves, are shown, one or more of the rollers 18 being drivable by a drive 21. A drive may also be provided for the rollers 16. After the welding point, which is represented symbolically by the welding beam 4, lead-out rollers, not separately identified by reference number, are provided. The roller and guide construction which has been described may be arranged on transverse walls 25 to 28 which preferably are themselves adjustable, and possibly lowerable, on a machine base frame. For this purpose, rails may be present on this machine base frame, with the walls 25 to 28 running on rail guides thereon. Likewise visible in the side view are the circulating stop pieces 8, which along a leg of the path dip into the tube-round, where they act as a stop for the edges of the latter; and the external forming pieces 15, of which, to simplify the drawing, only some are shown in the figure, as a continuous belt 15.

Figure 3:
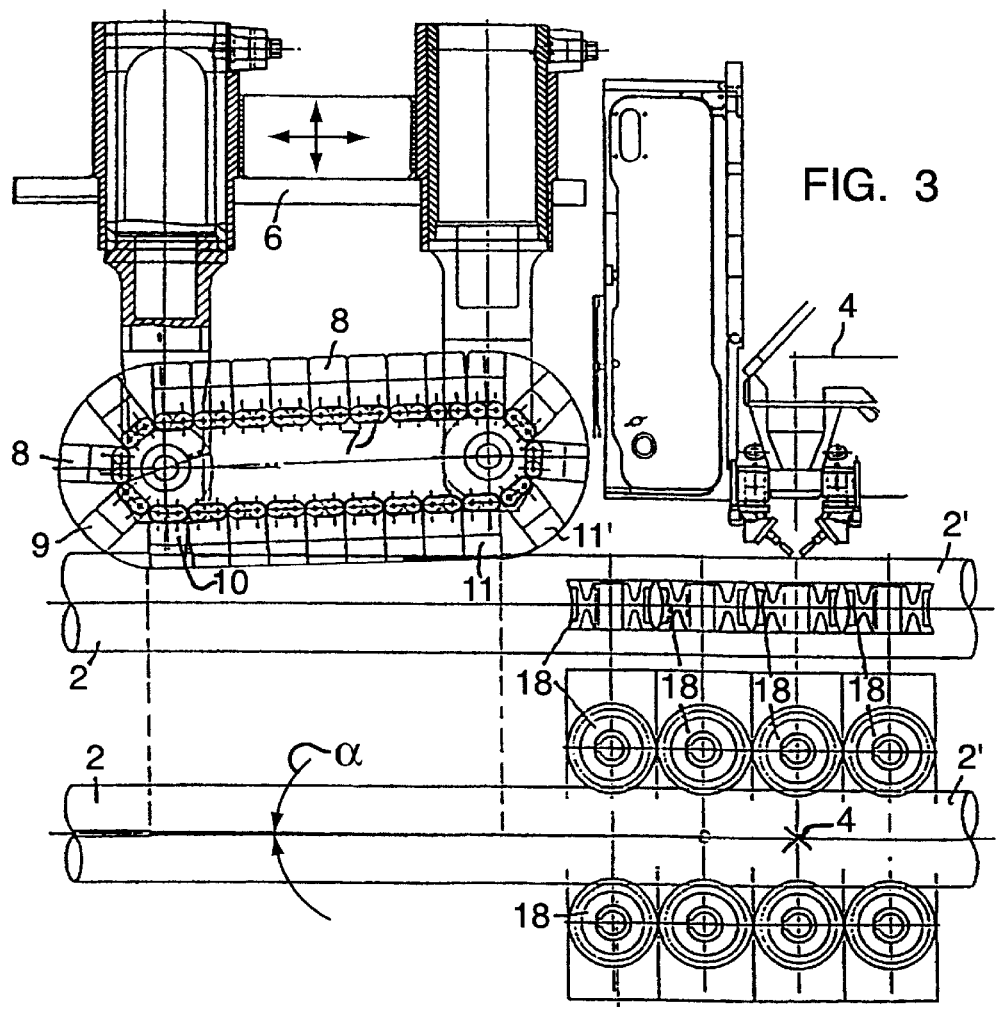
FIG. 3 is a schematic simplified side view and top view of an embodiment to illustrate the locator element.
Figure 4:
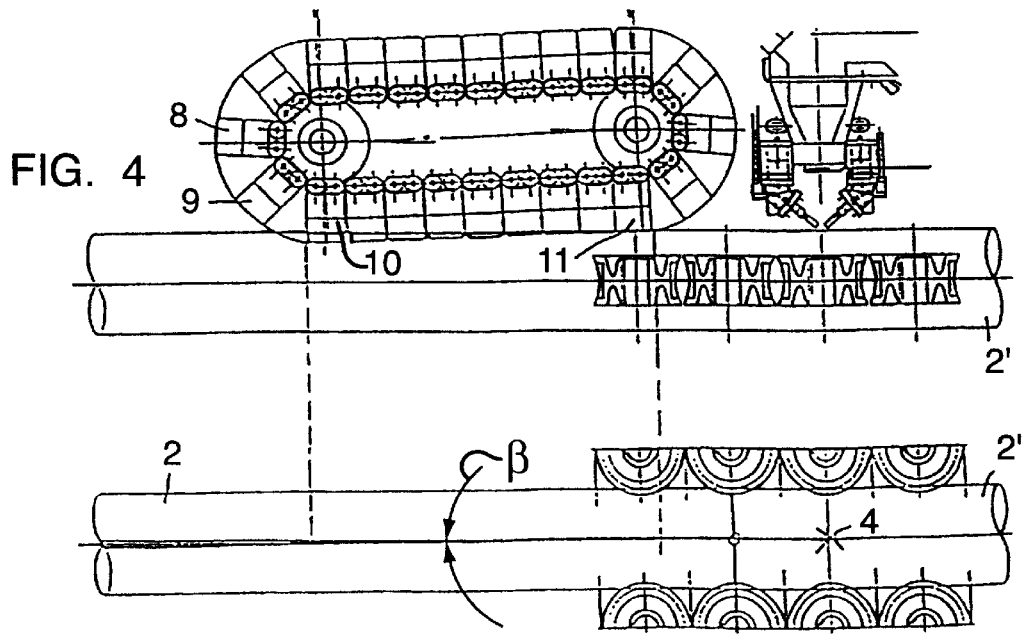
FIG. 4 is a similar representation to FIG. 3 but with the locator element in a different position.

FIG. 3 shows another side view, this time accompanied by a top view, of the round 2 and the rollers 18, of which eight are shown here by way of example. The purpose of FIG. 3 and also FIG. 4 is to illustrate the dip, and the formation of a narrowing stop, by the locator element, and for that reason the outer forming elements 15 are not shown here, though they could of course also be present. The welding point is again merely symbolically represented by the laser beam 4. The carrier 6 is adjustable in the directions of the arrows shown. The sprocket which is located at the rear in the conveying direction, and on which the stop pieces 8, 9 and 10 are seen, is positioned lower down than the front sprocket, on which the stop pieces 11 and 11, are located, with the result that there is a rise in the chain 7 in the conveying direction. The effect of this rise, together with the fact that the stop pieces 8, 9, 11' etc. are wedge-shaped, is a stop that grows narrower, since the stop pieces further away from the welding point dip into the round more deeply, so forming the stop with their more widely parted flanks, than the stop pieces located nearer to the welding point with their more closely adjacent flanks.

The result is a stop which grows narrower in the conveying direction and which, as already explained, travels with the tube-round. The rate of travel is preferably such that there is no relative movement in the conveying direction between stop and edges. In FIG. 3 and in FIG. 4 the dipping parts of the stop pieces are shaded, so that the decrease in the depth of insertion along the common leg of the edges and stop pieces is clearly visible in the drawing. When the carrier is set in the position shown in FIG. 3, insertion is relatively deep, hence the stop for the edges is relatively wide. In this position, however, the carrier 6 is set further back from the welding point 4 than in FIG. 4. In FIG. 4, the carrier (no longer shown) has been brought closer to the welding point, but a smaller depth of insertion of the stop pieces has been set, so that the stop within the tube-round for the edges of the tube-round is narrower overall. The stop can be set as desired by adjusting the carrier accordingly. In both cases the result is an edge stop that travels with the tube and is therefore frictionless in the conveying direction, thus allowing precise positioning of the edges. A friction component does arise owing to the successive lifting of the stop pieces i.e. to their being pulled up out of the tube-round. Such friction is, however, desirable, as it causes the edges to be pulled upwards by the stop piece and thus to be brought to bear on the corresponding external guide means, e.g. external rollers, or the external forming pieces 15 previously mentioned. The movement of the stop pieces out of the tube-round can be set by guides on the chain, otherwise than as in the illustrated example. For instance, chain guides can be provided to impart a more forceful vertical motion component to the stop pieces in the region of the emerging stop piece 11, so that successive stop pieces 11 are withdrawn from the tube-round not by the gyratory motion shown in these examples, but substantially by being pulled out vertically. The angle a or 0 formed by the narrowing stop may be e.g. one degree or less.

Figure 5:
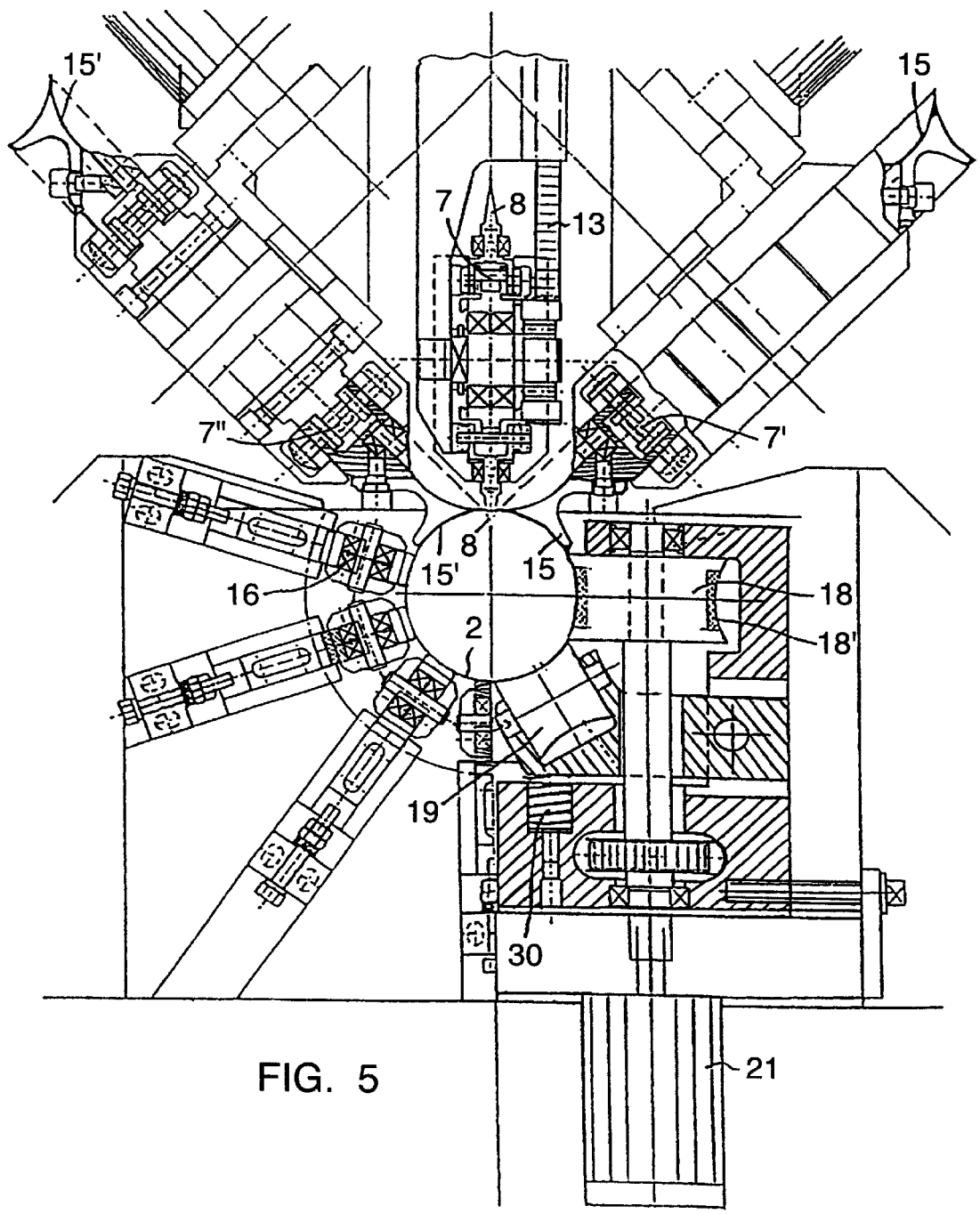
FIG. 5 is a section view on two section planes through an embodiment according to FIG. 1.

FIG. 5 shows a section through an embodiment which essentially corresponds to the embodiments which have been discussed. The section plane chosen for the left half of FIG. 5 lies in the region of the rollers 16, while for the right half of the figure the chosen section plane lies in the region of the rollers 18 and 19. Where the same parts occur they are designated with the same reference symbols as hitherto. FIG. 5 shows in cross-section the tube-round 2 and a wedge-shaped stop piece 8 (one of many) inserted in the tube-round. It can be seen how the edges of the tube-round 2 press against the stop piece. Forming pieces 15 and 15' are arranged on chains 7' and 7" respectively. These forming pieces bear on the outside of the tube-round 2, and also travel along with it. They constitute a profiled shell that clasps the upper region of the tube-round, and travels with it. Both the rollers 16 and the rollers 18 and 19 push the tube-round into the shell, pressing its edges against the stop element 8. In the welding zone the roller 19 can be pushed against the tube-round 2 by the force of a spring 30, or possibly e.g. pneumatically or magnetically by a controlled actuator, in order to press the tube-round against the shell 15, 15' travelling with it, and against the stop element 8. The live roller 18 can e.g. be provided with magnets 18' to convey a magnetic tube-round. Magnet means or pneumatic suction means can also be provided in the forming pieces 15 and 15' to promote contact between the wall of the tube-round 2 and the forming pieces. The chains 7' and 7" on which the forming pieces 15 and 15', respectively, are arranged are likewise driven by a drive (not shown), preferably at the same speed as the tube. The forming pieces 15 and 15' may be exchangeable, for adaptation to different shapes of tube and tube-round.

FIG. 6 shows a tube-round of another shape, with forming pieces 15 and 15' shaped accordingly. Otherwise, the reference symbols denote the same parts as hitherto.

It will be apparent that the travelling forming elements on the one hand and the travelling locator element on the other hand are both able to provide good positioning of the edges and an essentially continuous closure of the tube-round. Harnessing both aspects results in particularly advantageous positioning of the edges and/or closure of the tube-round.

FIGS. 7 and 8 show embodiments in which the bottom rollers are also replaced by external forming elements which travel with the individual tube-round and tube. This creates an substantially closed shell, although, as before, there is of course a gap between the upper forming pieces, both to allow insertion of the locator element and to leave the actual welding zone clear for the laser beam. The lower forming elements do, however, adjoin the upper forming elements to make up a substantially closed shell, which in FIG. 7 is configured for edge-positioning and guiding an oval tube form, and in FIG. 8, for positioning and guiding a triangular tube form. In these examples, as in the previous designs, the forming elements consist of preferably exchangeable forming pieces arranged on chains or belts and propelled by the chains or belts in a manner not shown in detail.

Figure 9:
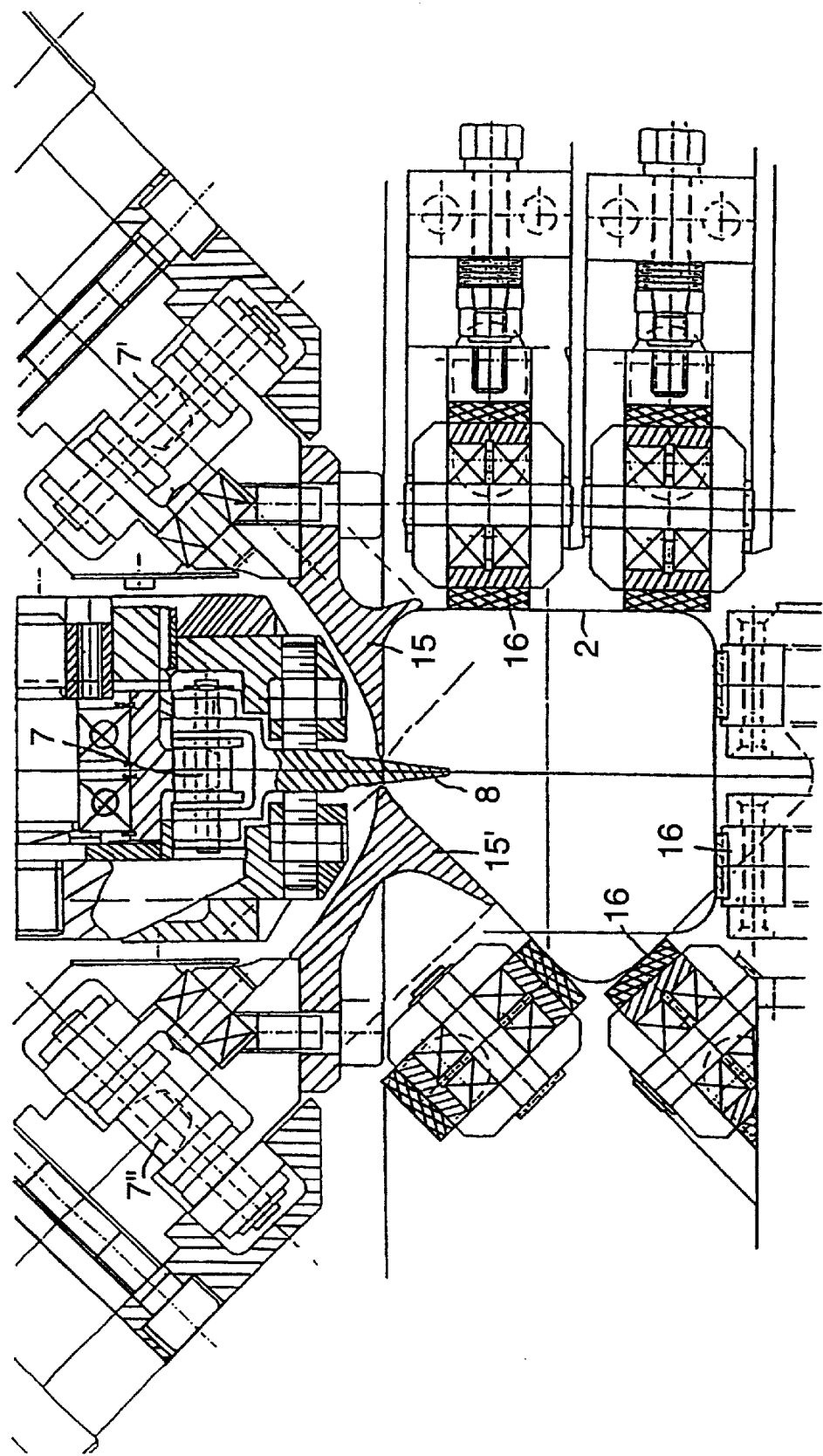
FIG. 9 is a section view of an embodiment of the apparatus.

FIG. 9 shows a further embodiment, in this case for edge-positioning of an asymmetrically shaped tube, in which differently shaped forming pieces 15 and 15' are employed. In other respects, the comments made on the previously described examples also apply to this example, and reference symbols denote the same parts as before.

Figure 10:
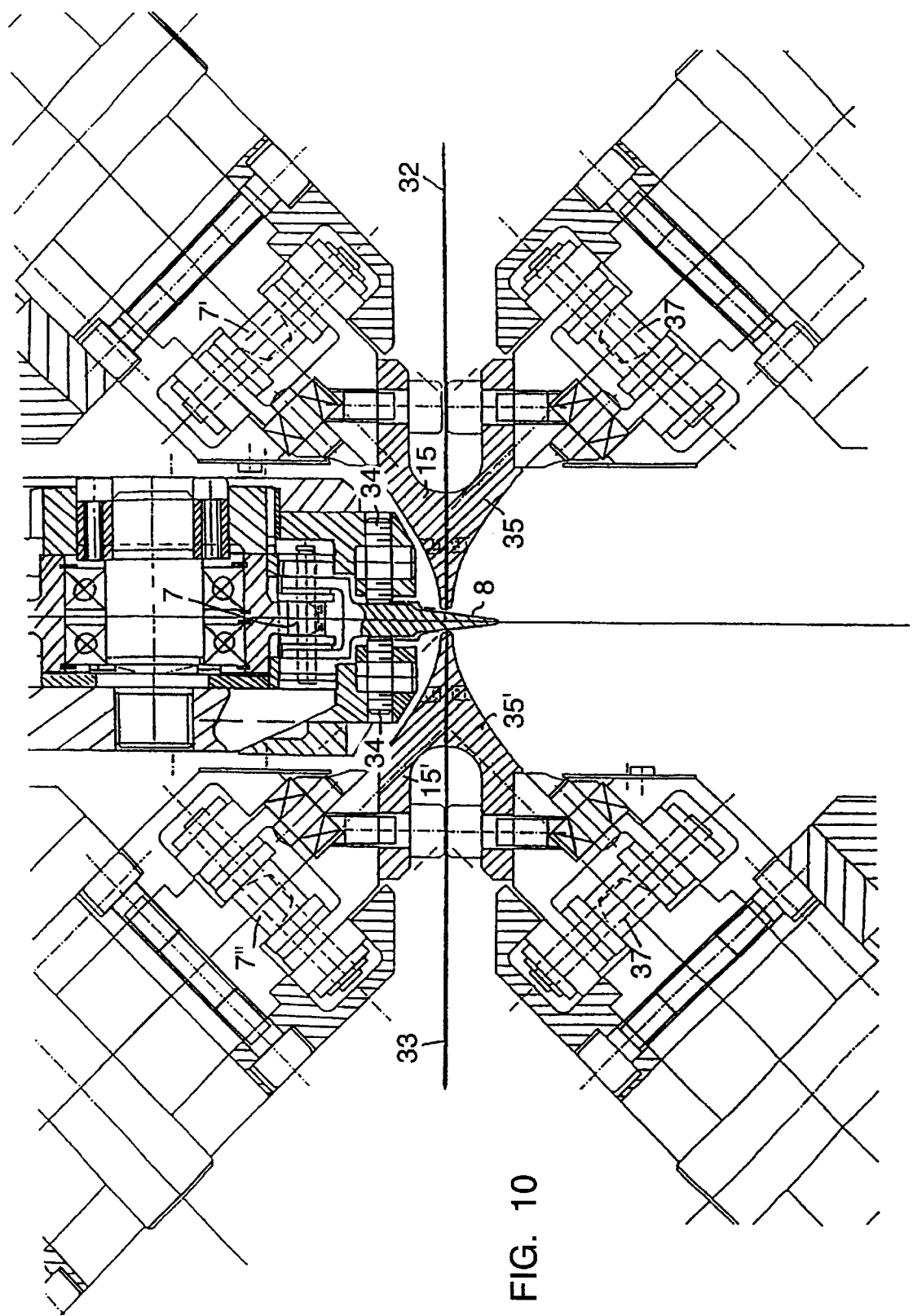
FIG. 10 is another section view of an embodiment.

FIG. 10 shows a further embodiment, in which both of the above-described aspects of the invention are used in the butt welding of flat metal sheets 32 and 33. The edges of the sheets are again brought into contact with stop pieces 8 of the locator element, which, as before, is chain-driven towards the welding point, preferably at the same speed as that at which the sheets are led to the welding point. Here also, the individual stop pieces are guided in guides 34, as is (or can be) the case for the embodiments which have already been described. Likewise present are the outer forming elements 15 and 15', again consisting of forming pieces preferably detachably arranged on chains 7' and 7" respectively. Here the forming pieces are shaped so as to provide a flat contact surface for each sheet. On the underside of the sheets, forming elements 35 and 35' are now also arranged which are likewise propelled by chain drives 37 and 37' so that they run with the sheets towards the welding point. Like the forming pieces in the previous embodiments, the forming pieces of this embodiment are arranged so that after the common path section with the workpiece they detach themselves from the latter, change direction and make a return pass, and, after a further change of direction, reestablish contact with the workpiece. In the illustrated example where flat sheets are to be welded, the forming elements and the locator element again bring about an exact positioning of the edges. In this embodiment also, the locator element is preferably wedge-shaped and the non-uniform depth of insertion of the wedges makes it a locator element which grows narrower towards the welding point, so that the sheet edges, which can be additionally pressed against the locator element by means not shown, move towards each other as they run towards the welding point.

Figure 11:
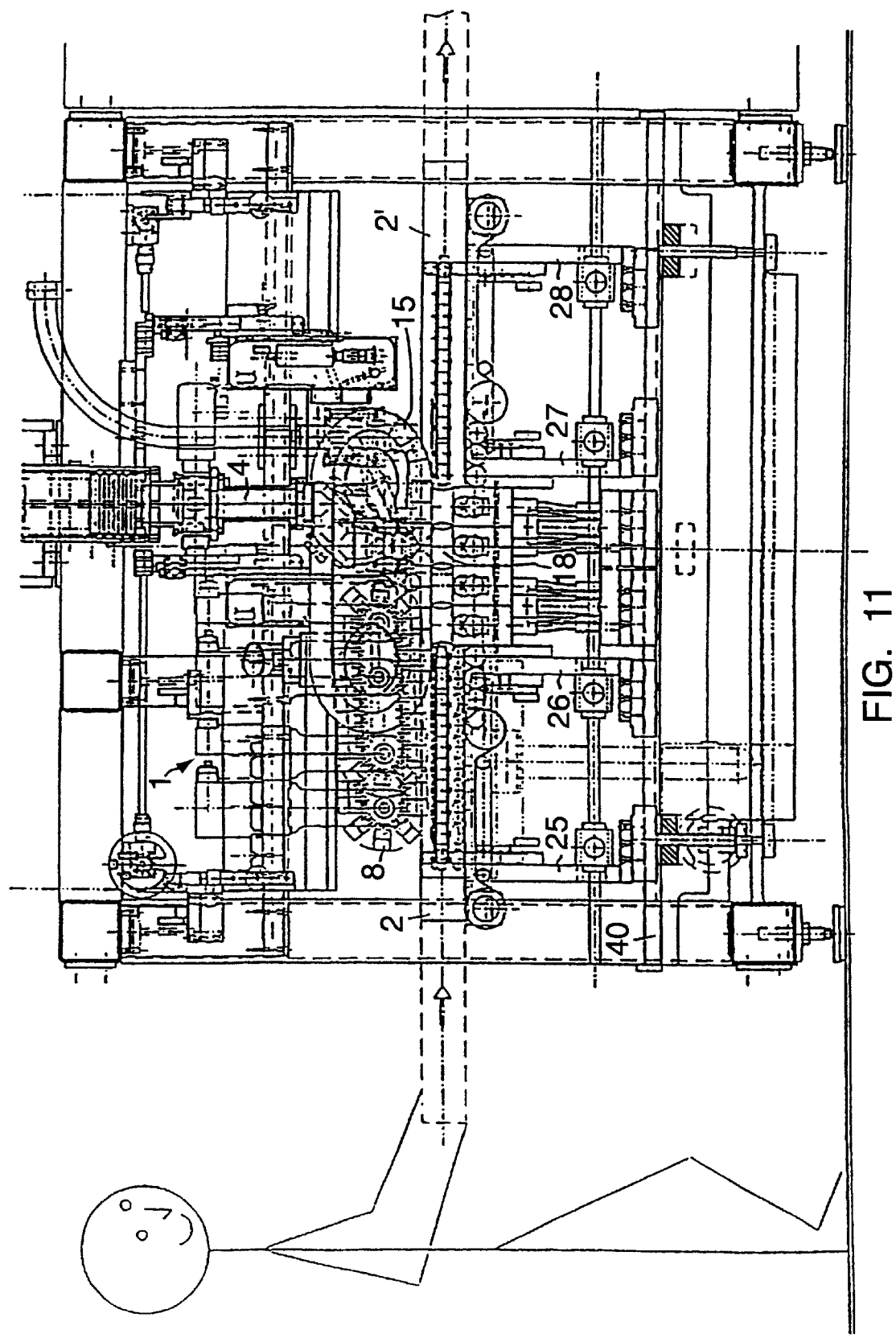
FIG. 11 is yet another section view of an embodiment.
Figure 12:
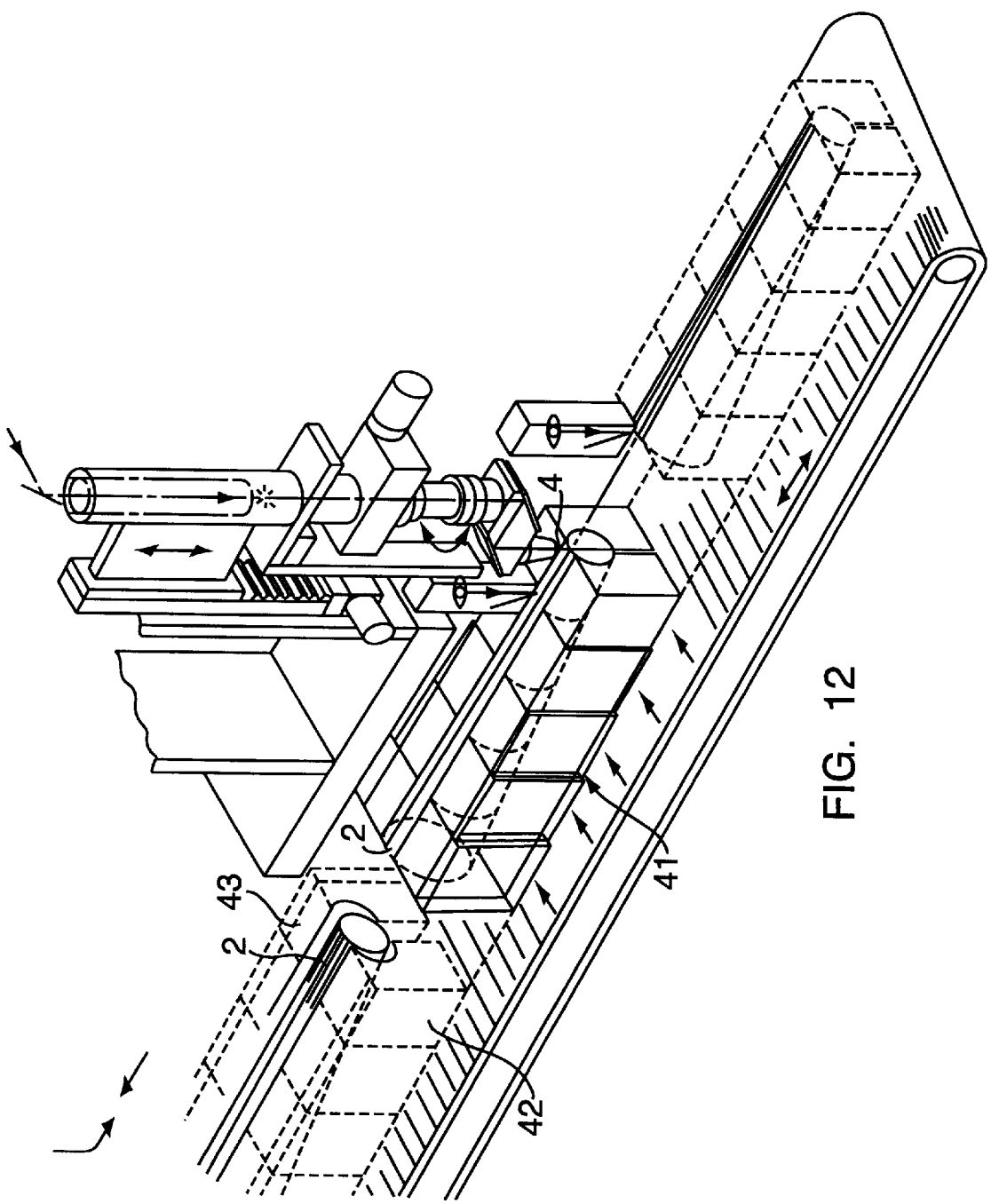
FIG. 12 is a schematic view of the welding apparatus for welding tapered tubes.
Figure 13:
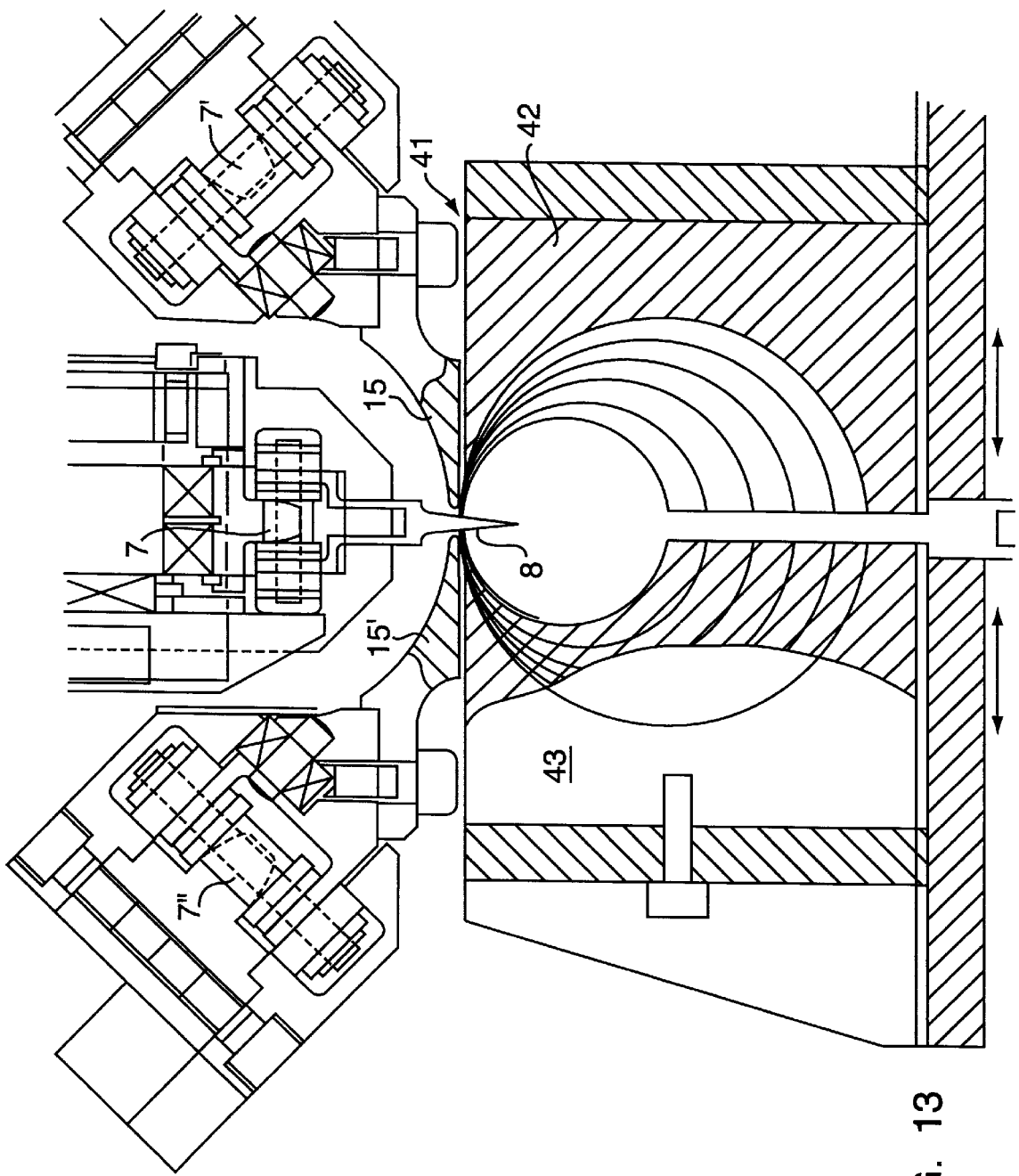
FIG. 13 is a front view of the embodiment of FIG. 12.

FIG. 11 shows a side view of a tube welding machine in which the above-mentioned aspects of the invention are realized, with parts designated by the same reference symbols as used hitherto. This side view reveals in particular how the walls 25 to 28 are releasably mounted on a rail 40. According to a further aspect of the invention, however, these wall parts 25 to 28, or a subgroup thereof, can be arranged so that they can be traversed along the rail, to cater for a further aspect of the invention which will be described with reference to FIGS. 12 and 13. In this, tapered tubes are welded, as can be seen in FIG. 12, where each tapered round is held in a conical die 41, which may for example be made up of several sections. This conical die together with its tube-round is transported past the welding beam; FIG. 12 shows a belt-type conveyor being used for this purpose. However, as already stated, the conical die can also be arranged on the traversable wall parts 25 to 28 from which the rollers have been removed, so that the conical die 41 can be attached to the wall parts. In this case the die 41 is preferably also built up from die halves 42 and 43 which can be opened and closed around the tube-round as indicated by arrows in FIG. 12 and also in FIG. 13. In FIG. 12, a first die is shown still in the open position and a second, which is already at the welding point, is shown in the closed position. The aspects of the invention which have already been described can also be used in this welding of tapered tubes, as is shown by FIG. 13, which shows a vertical section through a closed die and the locator element and forming elements. Here again, use is made of the locator element with wedge-shaped pieces 8 which act as a stop for the edges of the preformed tapered tube-round. This locator element, too, is preferably designed as one which grows narrower towards the welding point. The forming elements 15 and 15' here constitute the upper closure of the die 41 with its die halves 42 and 43. On the one hand, the forming elements serve as an upper stop for the margins of the conical round and serve to position the edges precisely. On the other hand, the forming elements here provide an upper closure for the die 41 and also shield it from the effect of heating by the welding beam 4. This makes it possible in particular to use plastic elements for the die 41, which is beneficial for reasons of production and cost.

Welding of the tapered tube in the illustrated embodiment is preferably done after the tube-round has first been run through the apparatus with the welding beam deactivated, the edges being positioned and the die closed during this initial pass. Welding is then performed as the tube-round is run back with the carriage formed by the walls 25–28, and the welded tube can then be unloaded and a new round loaded into the open die.

Each of the welding apparatuses which have been described can be equipped, in a manner known in itself, with an optical edge detection unit ahead of the welding beam. The output signal of such an edge detection unit can be used in particular to control the above-mentioned roller 19 which exerts force on the tube-round in a direction essentially towards the weld line, in order to bring the edges to bear with defined pressure on the locator element and/or the forming elements. A roller 50 can also be provided, as shown in FIG. 1. This roller 50 is arranged between the locator element and the welding point, and acts on the opposing sheet parts from above, in the gap between the forming elements 15 and 15'. It may likewise be spring-mounted, or controlled in its movement in which case the output signals from an edge evaluation system can again be used to bring the edges ahead of the welding point into optimal register for welding. The roller 50 may e.g. also be made in two pieces with a sandwiched insulating layer so that a test current can be passed through the roller to the two opposing regions of the sheet. It is then possible to determine by means of the test current whether or not the contact between the sheet edges is sufficient for welding. In this case the roller 50 can if necessary be replaced or backed up by an optical seam monitoring system. A seam inspection station, in particular an optical seam inspection station, can also be arranged after the welding point, in a known manner.

What is claimed is:

1. Method for positioning sheet-metal edges as they are conveyed to a welding point for butt welding by laser, comprising: bringing the edges to bear on an endless locator element which along a leg of the conveyor path projects between the edges and which travels with the edges within said leg, the locator element being formed by a revolving chain or revolving belt with a plurality of stops arranged thereon, and acting on at least part of the sheet margin with at least one endless forming element travelling with the edges towards the welding point, the forming element being a chain or belt with a plurality of forming pieces arranged thereon.

2. Method according to claim 1, welding of preformed tube-rounds into tubes, where these are thin-walled tube-rounds with a ratio of tube diameter to tube material thickness equal to or greater than 65.

3. Method according to claim 1, wherein the plurality of forming pieces on the chain or belt are exchangeable for adaptation to different shapes.

4. Method for welding tapered tubes, according to claim 1, characterized in that a conically preformed tube-round is arranged in a conical die and the weld-side upper closure of the conical die is provided by at least one endless forming element which can be conveyed together with the die.

5. Method according to claim 1, characterized in that at least one roller acting on the sheets in the region of the weld line is provided before the welding point.

6. Method according to claim 1, characterized in that a stop of varying width is formed by the locator element by virtue of the fact that the locator element has wedge-shaped stops which dip between the edges to different depths along the leg.

7. Method according to claim 6, characterized in that the locator element forms a stop which grows narrower in the conveying direction of the edges.

8. Method according to claim 6, characterized in that the withdrawal of the stops towards the end of the leg is influenced, so that withdrawal is effected essentially vertically with respect to the sheet surface.

9. Method according to claim 1, characterized in that a forming element is provided on each side of the weld line, which forming elements are provided as a cup-shaped containing element for the sheet.

10. Method according to claim 9, characterized in that the sheet is acted on below the forming elements by a plurality of rollers.

11. Method according to claim 9, characterized in that magnetic or pneumatic means are provided in the forming elements which promote contact between the sheet and the forming elements.

12. Method according to claim 9, characterized in that further forming elements are provided and in that a substantially closed containing element is provided by the forming elements.

13. Method according to claim 9, wherein the sheet is acted on in the welding zone by profile-matching rollers.

14. Method according to claim 13, characterized in that at least one of the profile-matching rollers acts on the sheet under the action of a spring or with actively generated controlled or regulated force in a direction essentially towards the weld line.

15. Apparatus for positioning, for butt welding, edges of metal sheets which are being conveyed by conveying means to a welding point, wherein the apparatus has an endless locator element which forms a stop for the edges and is intended to dip between the edges along a leg of the same, characterized in that the locator element comprises a revolving chain or revolving belt and a drive for the chain or belt and a plurality of stops arranged on the chain or belt, and in that the apparatus also has at least one driven, endless forming element which is configured to create a forming zone at least for one margin of the sheet, and is formed by a chain or belt with a plurality of forming pieces arranged thereon.

16. Apparatus according to claim 15, characterized in that the locator element is arranged on a carrier adjustable in position with respect to the conveying means and/or welding point.

17. Apparatus according to claim 15, characterized in that a plurality of rollers (16, 18, 19) are arranged below the forming elements, at least one of the rollers (19) being configured to exert the force of a spring or a force generated by a controlled or regulated force-generating means in a direction essentially towards the weld line.

18. Apparatus according to claim 15, characterized in that the locator element has wedge-shaped stops.

19. Apparatus according to claim 15, wherein the plurality of forming pieces arranged on the chain or belt are exchangeable for metal sheets of different shapes.

20. Apparatus for welding tapered tubes, according to claim 15, characterized by a conical die to contain a tube-round, and the at least one endless forming element can be conveyed with the die to the welding point and back with the die to the starting-point, and provides the upper weld-side closure of the die.

21. Apparatus according to claim 15, for a welding machine for welding preformed tube-rounds into tubes, where the tube-rounds are thin-walled tube-rounds with a ratio of tube diameter to tube material thickness approximately equal to or greater than 65.

22. Welding apparatus with a positioning apparatus according to claim 15.

23. Apparatus according to claim 15, characterized in that two forming elements are provided, which together make up an upper profiled shell located on either side of the weld line.

24. Apparatus according to claim 23, characterized in that further forming elements are provided, which together with the upper profiled shell make up a substantially closed profiled shell.

25. Apparatus according to claim 23, characterized in that at least one roller (50) positioned on the weld line before the welding point, and projecting into the profiled shell, is provided.

* * * * *